United States Patent
Garcia et al.

(10) Patent No.: US 12,052,065 B2
(45) Date of Patent: Jul. 30, 2024

(54) SELECTING UPLINK TRANSMISSION BAND IN WIRELESS NETWORK

(71) Applicant: Nokia Solutions and Networks Oy, Espoo (FI)

(72) Inventors: Ian Dexter Garcia, Naperville, IL (US); Jamil Shihab, Naperville, IL (US); Ruth Gayde, Naperville, IL (US); Hua Xu, Hawthorn Woods, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 404 days.

(21) Appl. No.: 17/427,959

(22) PCT Filed: Jan. 29, 2020

(86) PCT No.: PCT/EP2020/052124
§ 371 (c)(1),
(2) Date: Aug. 3, 2021

(87) PCT Pub. No.: WO2020/160974
PCT Pub. Date: Aug. 13, 2020

(65) Prior Publication Data
US 2022/0131625 A1   Apr. 28, 2022

(30) Foreign Application Priority Data
Feb. 4, 2019   (FI) ........................................ 20195069

(51) Int. Cl.
*H04B 17/318* (2015.01)
*G06N 3/044* (2023.01)
*G06N 3/08* (2023.01)
*H04W 24/10* (2009.01)
(Continued)

(52) U.S. Cl.
CPC ............ *H04B 17/318* (2015.01); *G06N 3/044* (2023.01); *G06N 3/08* (2013.01); *H04W 24/10* (2013.01)

(58) Field of Classification Search
None
See application file for complete search history.

(56) References Cited

U.S. PATENT DOCUMENTS

| 9,301,307 | B1 | 3/2016 | Park et al. |
| 9,439,081 | B1* | 9/2016 | Knebl .................... G06N 20/00 |
| 2018/0026703 | A1 | 1/2018 | Bhargava et al. |

FOREIGN PATENT DOCUMENTS

| EP | 3 001 717 A1 | 3/2016 | |
| WO | WO 2017/180338 A1 | 10/2017 | |
| WO | WO-2017180338 A1 * | 10/2017 | ........... H04B 17/318 |

* cited by examiner

*Primary Examiner* — Kouroush Mohebbi
(74) *Attorney, Agent, or Firm* — Joseph C. Drish; Harrington & Smith (57) ABSTRACT

A method includes selecting a received signal strength threshold level for determining whether an uplink resource of a terminal device is allocated from a first frequency band or from a second frequency band, and wherein the first frequency band is for terminal devices having a received signal strength above the received signal strength threshold level and the second frequency band is for terminal devices having the received signal strength below the received signal strength threshold level; outputting the received signal strength threshold level to be broadcasted in a cell; acquiring received signal strength values measured for a plurality of terminal devices in the cell and further acquiring and at least one performance metric target; and changing the received signal strength threshold level on the basis of the measured received signal strength values and the at least one performance metric target.

30 Claims, 6 Drawing Sheets

SELECTING UPLINK TRANSMISSION BAND IN WIRELESS NETWORK

CROSS REFERENCE TO RELATED APPLICATION

This patent application is a U.S. National Stage application of International Patent Application Number PCT/EP2020/052124 filed Jan. 29, 2020, which is hereby incorporated by reference in its entirety, and claims priority to FI 20195069 filed Feb. 4, 2019.

TECHNICAL FIELD

The invention relates to communications in a wireless communication system and, in particular, to selecting an uplink frequency band for a terminal device.

BACKGROUND

Higher transmission bands are taken into use in modern cellular communication systems. As the communication bands switch to higher frequencies, signal propagation characteristics tend to degrade. Furthermore, terminal devices have limited transmission power capabilities. To compensate for these characteristics, some communication systems employ a scheme where main communication bands are provided on higher frequencies while supplementary communication bands are provided on lower frequencies. The supplementary communication bands provide more reliability while the main communication bands provide higher throughput. Selecting a communication band for a terminal device affects overall system performance.

BRIEF DESCRIPTION

According to an aspect, there is provided the subject matter of the independent claims. Some embodiments are defined in the dependent claims.

According to an aspect, there is provided an apparatus comprising: at least one processor; and at least one memory including computer program code, the at least one memory and computer program code configured to, with the at least one processor, cause the apparatus to: select a received signal strength threshold level for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level; output the received signal strength threshold level to be broadcasted in a cell; acquire received signal strength values measured for a plurality of terminal devices in the cell while the received signal strength threshold level has been applied to the cell and further acquiring and at least one performance metric target; and change the received signal strength threshold level on the basis of the measured received signal strength values and the at least one performance metric target.

In an embodiment, the at least one memory and the computer program code are further configured, with the at least one processor, to cause the apparatus to acquire at least one performance metric measured while the received signal strength threshold level has been applied to the cell and to change the received signal strength threshold level further on the basis of the measured at least one performance metric.

In an embodiment, the at least one measured performance metric comprises at least one of a disconnection rate, a connection setup failure rate, and a channel quality indicator.

In an embodiment, the at least one memory and the computer program code are further configured, with the at least one processor, to cause the apparatus to acquire locations of the plurality terminal devices and to change the received signal strength threshold level further on the basis of the locations of the plurality of terminal devices.

In an embodiment, the at least one memory and the computer program code are further configured, with the at least one processor, to cause the apparatus to acquire time stamps indicating a time of measuring the received signal strength value and to change the received signal strength threshold level further on the basis of the time stamps.

In an embodiment, the at least one memory and the computer program code are further configured, with the at least one processor, to cause the apparatus to set an upper bound and a lower bound for the received signal strength threshold level and to change the received signal strength threshold level within the upper bound and the lower bound.

In an embodiment, the at least one memory and the computer program code are further configured, with the at least one processor, to cause the apparatus to change the received signal strength threshold level on the basis of a relation between the at least one measured performance metric and the at least one performance metric target.

In an embodiment, the at least one memory and the computer program code are further configured, with the at least one processor, to cause the apparatus to employ a neural network to determine the change to the received signal strength threshold level, wherein the neural network is trained by using the acquired received signal strength values and the at least one measured performance metric as a training input and the selected received signal strength threshold level as a training output.

In an embodiment, the neural network is a recurrent neural network.

In an embodiment, the at least one memory and the computer program code are further configured, with the at least one processor, to cause the apparatus to change the received signal strength threshold level in a series of steps, each step comprising: selecting an increment value to the received signal strength threshold level and estimating an effect of the increment value on the at least one performance metric; accumulating the received signal strength threshold level with the increment value; and determining whether or not to terminate the series of steps.

In an embodiment, the effect of the increment value on the at least one performance metric is estimated by using a neural network, level, wherein the at least one memory and the computer program code are further configured, with the at least one processor, to cause the apparatus to train neural network by using the acquired received signal strength value, the at least one measured performance metric, and the increment value and/or another increment value as a training input and a known effect of the increment value on the at least one performance metric as a training output.

According to an aspect, there is provided a method comprising: selecting, by a network node, a received signal strength threshold level for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level; outputting, by the network node, the received signal strength threshold level to be broadcasted in a cell; acquiring, by the network node, received signal strength values measured for a plurality of terminal devices in the cell while the received signal strength threshold level has been applied to the cell and further acquiring and at least one performance metric target; and changing, by the network node, the received signal strength threshold level on the basis of the measured received signal strength values and the at least one performance metric target.

In an embodiment, the method further comprises by the network node: acquiring at least one performance metric measured while the received signal strength threshold level has been applied to the cell and changing the received signal strength threshold level further on the basis of the measured at least one performance metric.

In an embodiment, the at least one measured performance metric comprises at least one of a disconnection rate, a connection setup failure rate, and a channel quality indicator.

In an embodiment, the method further comprises by the network node: acquiring locations of the plurality terminal devices and changing the received signal strength threshold level further on the basis of the locations of the plurality of terminal devices.

In an embodiment, the method further comprises by the network node: acquiring time stamps indicating a time of measuring the received signal strength value and changing the received signal strength threshold level further on the basis of the time stamps.

In an embodiment, the method further comprises by the network node: setting an upper bound and a lower bound for the received signal strength threshold level and changing the received signal strength threshold level within the upper bound and the lower bound.

In an embodiment, the method further comprises by the network node: changing the received signal strength threshold level on the basis of a relation between the at least one measured performance metric and the at least one performance metric target.

In an embodiment, the method further comprises by the network node: employing a neural network to determine the change to the received signal strength threshold level, and training the neural network by using the acquired received signal strength values and the at least one measured performance metric as a training input and the selected received signal strength threshold level as a training output.

In an embodiment, the neural network is a recurrent neural network.

In an embodiment, the method further comprises by the network node: changing the received signal strength threshold level in a series of steps, each step comprising: selecting an increment value to the received signal strength threshold level and estimating an effect of the increment value on the at least one performance metric; accumulating the received signal strength threshold level with the increment value; and determining whether or not to terminate the series of steps.

In an embodiment, the effect of the increment value on the at least one performance metric is estimated by using a neural network, level, and the method further comprises by the network node: training the neural network by using the acquired received signal strength value, the at least one measured performance metric, and the increment value and/or another increment value as a training input and a known effect of the increment value on the at least one performance metric as a training output.

According to another aspect, there is provided an apparatus comprising means for causing the apparatus to perform the steps of any one of the above-described methods performed by the network node. In an embodiment, the means comprises the at least one processor and the at least one memory described above in connection with the apparatus.

According to another aspect, there is provided a computer program product embodied on a computer-readable medium and comprising a computer program code readable by a computer, wherein the computer program code configures the computer to carry out a computer process comprising: selecting a received signal strength threshold level for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level; outputting the received signal strength threshold level to be broadcasted in a cell; acquiring received signal strength values measured for a plurality of terminal devices in the cell while the received signal strength threshold level has been applied to the cell and further acquiring and at least one performance metric target; and changing the received signal strength threshold level on the basis of the measured received signal strength values and the at least one performance metric target.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
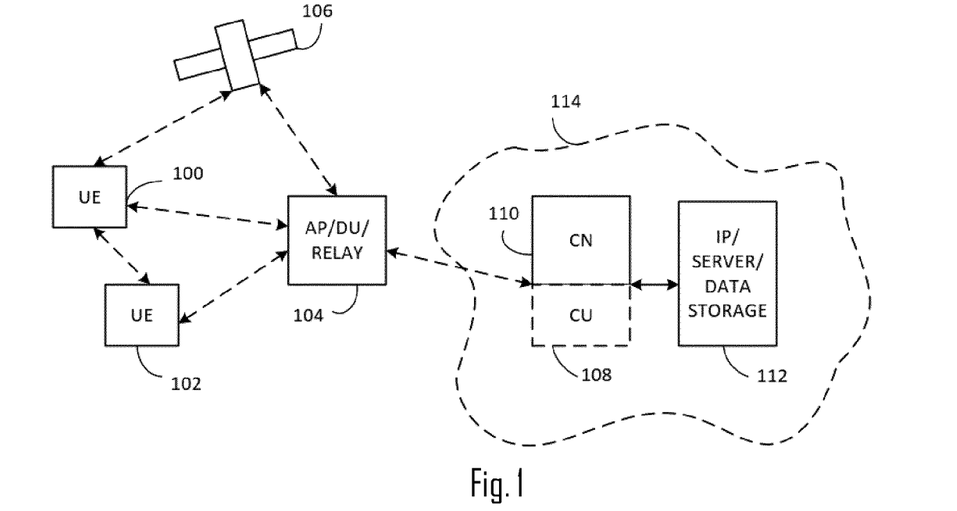
FIGS. 1 and 2 illustrate an example of a wireless network to which embodiments of the invention may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As described in Background, the system of FIG. 1 may comprise cells that provide the terminal devices with at least two frequency bands for uplink communications: a main frequency band on a higher frequency band and a supplementary frequency band on a lower frequency band. As a non-limiting example, the main frequency band may be provided on frequencies such as 3.5 Gigahertz (GHz) while the supplementary frequency band may be provided on frequencies such as 700 MHz. The main frequency band may be provided by a main component carrier while the supplementary frequency band may be provided by a supplementary component carrier, and a center frequency of the main component carrier may be higher than a center frequency of the supplementary component carrier. The main frequency band may be non-overlapping with the supplementary frequency band.

Figure 2:
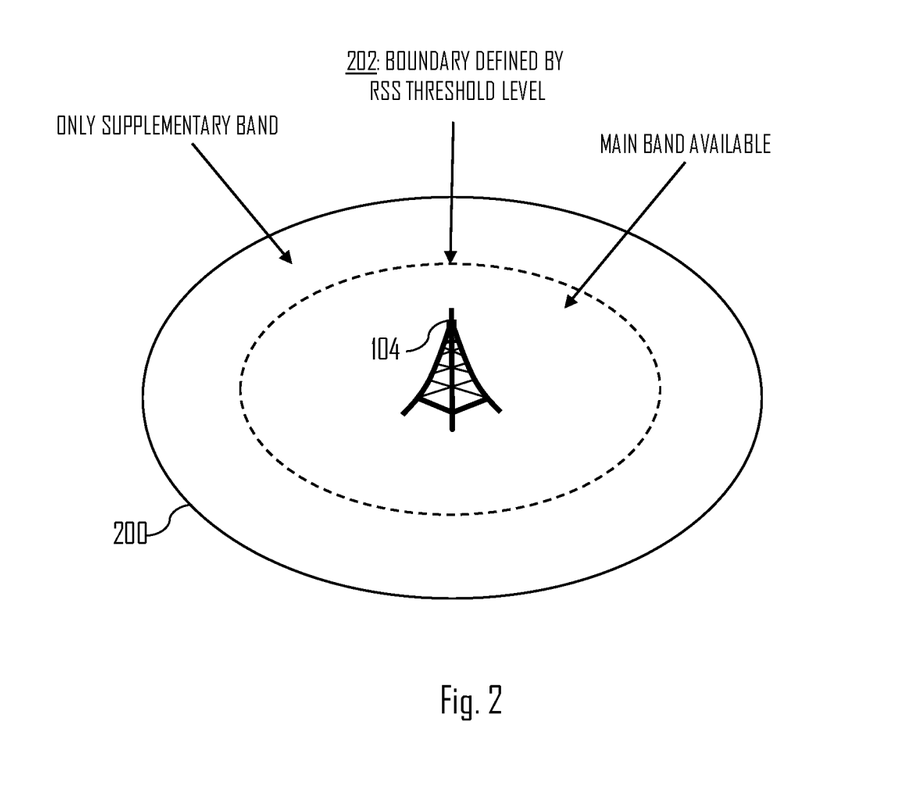

An access node managing a cell may specify a boundary for a terminal device to select the frequency band. FIG. 2 illustrates such a boundary 202. The boundary may be defined such that terminal devices on the edge of the cell 200 select the supplementary frequency band while terminal devices close to the access node 104 select either the main frequency band or the supplementary frequency band or only select the main frequency band. The boundary may be defined by a reception signal strength (RSS) threshold level. The reception signal strength may refer to signal strength measured by a terminal device from a reference signal transmitted by the access node 104. An example of such a reference signal is a sounding reference signal, a beacon signal, or a pilot signal. The signal strength may be defined in terms of reference signal received power (RSRP), received signal strength indicator (RSSI), or reference signal received quality (RSRQ) specified in 3GPP specification, or another similar indicator may be used. The RSS threshold may be defined in terms of the RSS indicator. If the measured RSS is above the threshold, indicating that the terminal device is close to the access node 104, the terminal device may select the main frequency band. If the measured RSS is below the threshold, indicating that the terminal device is far from the access node 104, the terminal device may be bound to select the supplementary frequency band. The terminal device may then employ the selected frequency band in initiating a connection request to the access node, e.g. in a random access procedure. The access node 104 may provide a random access channel (RACH) on both frequency bands.

As described above, the selection of the threshold level affects the performance of the devices and connections in the cell 200. If the RSS threshold is too low, more terminal devices close to the cell edge may select the main frequency band and experience disconnections or failed connection establishments. If the RSS threshold is too high, more terminal devices select the supplementary frequency band and get no benefit from the higher bandwidth and throughput in the main frequency band. Furthermore, a location distribution of the terminal devices within the cell 200 and, thus, one of the frequency bands may get overloaded while the other frequency band has extra capacity.

Figure 3:
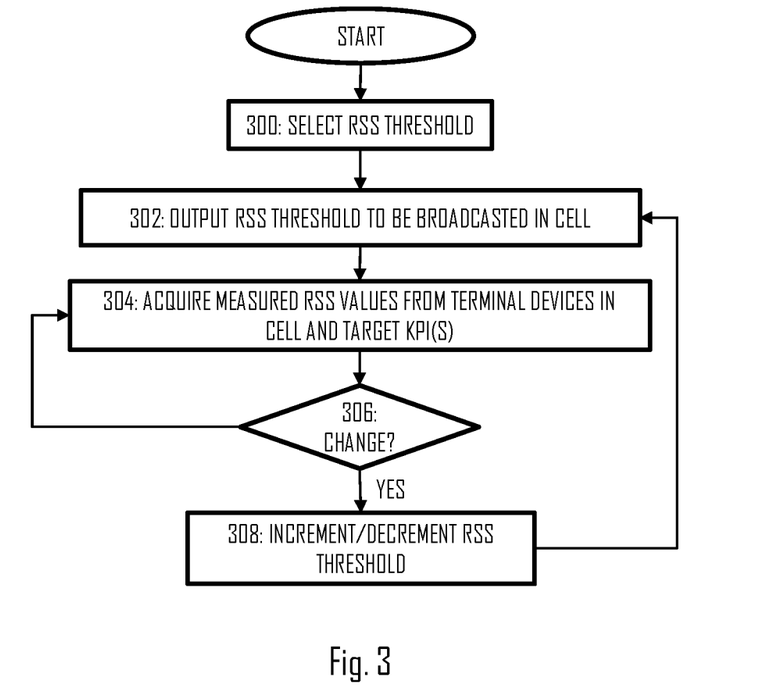
FIG. 3 illustrates a flow diagram of a process for updating a received signal strength (RSS) threshold level used for frequency band selection according to an embodiment of the invention.

FIG. 3 illustrates an embodiment of a method for selecting the RSS threshold. The method may be performed by the access node or another network node in the network infrastructure of FIG. 1. Referring to FIG. 3, the method comprises as performed by a network node: selecting (block 300) a RSS threshold level for determining whether an uplink resource of a terminal device is selected from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level; outputting (block 302) the received signal strength threshold level to be broadcasted in a cell; acquiring (block 304) received signal strength values measured for a plurality of terminal devices in the cell while the received signal strength threshold level has been applied to the cell and further acquiring and at least one performance metric (a key performance metric, KPI) target; and changing (blocks 306 and 308) the received signal strength threshold level on the basis of the measured received signal strength values and the at least one performance metric target.

Block 306 may comprises determining whether or not to change the RSS threshold level selected in block 300. If the change is needed, the process proceeds to block 308. Otherwise, the process may return to block 304.

The embodiment of FIG. 3 provides a solution for adjusting the RSS threshold level and, thus provides capability to adapt to changing traffic and channel situations. Accordingly, the overall performance of the system and individual links may be improved.

The embodiment of FIG. 3 uses the measured RSS values and the KPI target to adjust the RSS threshold. As described in embodiments below, the RSS values may provide sufficient information on current performance to allow the adjustment of the RSS threshold such that the KPI target may be achieved.

In an embodiment, the method further comprises acquiring at least one performance metric measured while the received signal strength threshold level has been applied to the cell, and blocks 306 and 308 comprise changing the RSS threshold level further on the basis of the measured at least one performance metric. The measured KPI(s) provide further information on the current performance with respect to the target and may help in making appropriate adjustments to the RSS threshold. The measured performance metric may comprise at least one of a disconnection rate, a connection setup failure rate, and a channel quality indicator. The measured performance metrics may be measured per terminal device, or per cell.

In an embodiment, the method further comprises acquiring locations of the plurality terminal devices and changing the RSS threshold level further on the basis of the locations of the plurality of terminal devices. The network node may store information on mapping between the RSS threshold levels and corresponding geographical locations to where each RSS threshold level sets the boundary 202. Accordingly, the network node may employ the locations of the terminal devices in setting the boundary such that a desired portion of the terminal devices are located inside the boundary while the remaining portion of the terminal devices are located outside the boundary. In this manner, the allocation of the terminal devices to the main and supplementary frequency bands may be balanced.

In an embodiment, the method further comprises acquiring time stamps indicating a time of measuring the RSS value(s) and changing the received signal strength threshold level further on the basis of the time stamps. The network node may store history data of previously received RSS values, old RSS threshold values and, optionally, associated KPI(s) and adjust the RSS threshold on the basis of the timing and the history data. The time stamps may indicate a time of the day or day of the week, for example. The traffic distribution may depend on the time of the day and day of the week, and have correlation between the same times of the day on different days and between same days of the week on different weeks. For example, the traffic may correlate during office hours of different days and the traffic may correlate during different days of a work week and during a weekend. This correlation may be used in blocks 306 and 308.

Figure 4:
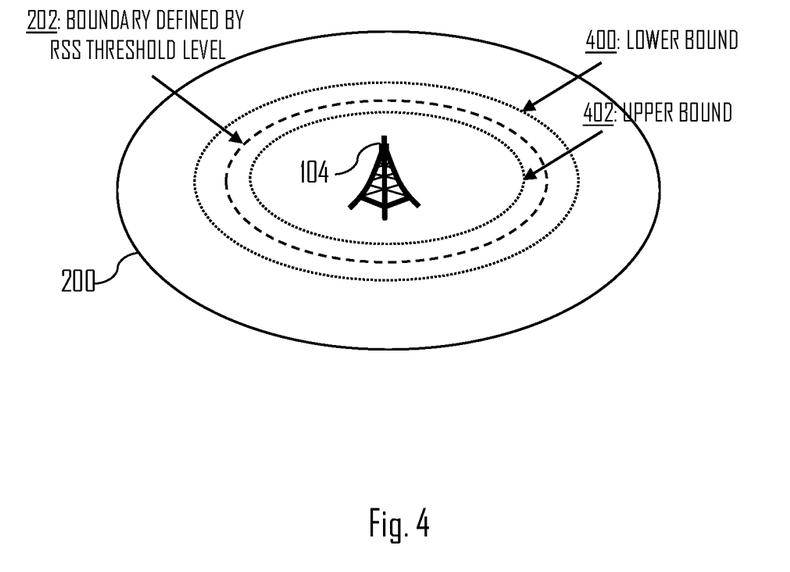
FIG. 4 illustrates a range for the RSS threshold level according to an embodiment of the invention.

In an embodiment, the method comprises setting an upper bound and a lower bound for the RSS threshold level and changing the RSS threshold level within the upper bound and the lower bound. FIG. 4 illustrates the boundary 202 defined by the RSS threshold, a boundary defined by the upper bound 402, and a boundary defined by the lower bound 400. The upper bound 402 and the lower bound 400 thus limit the range of the RSS threshold value. The bounds 400, 402 may be used to limit the effects of the RSS threshold selection algorithm that attempts to overly optimize a certain KPI.

Let us then describe some embodiments of blocks 306 and 308 with reference to FIGS. 5 to 9.

Execution of blocks 306 and 308 may be based on the following assumptions. The main frequency band and the supplementary frequency band have sufficient random access channel resources so that consideration of RACH collisions can be avoided. In a similar manner, uplink control channel resources are considered sufficient for all terminal devices. Uplink control channel and uplink data channel are selected for a given terminal device from the same frequency band, either the main frequency band or the supplementary frequency band. Assuming that communication parameters for the main frequency band and the supplementary frequency band are equal, the supplementary frequency band provides better reliability of communications. Radio link failures, call drops, unsuccessful connection establishments and failed bearer setup procedures will become more probable if the RSS threshold level is decreased, i.e. measured KPI:s will drop. The main frequency band can provide better throughput in terms of larger bandwidth.

The operation in blocks 306 and 308 may be characterized by minimizing the RSS threshold while aiming to meet target KPI:s regarding the accessibility of the terminal devices. In other words, the RSS threshold is set in such manner that the highest possible number of terminal devices will be allocated to the main frequency band while maintaining the accessibility of such terminal devices within the target KPI. Blocks 306 and 308 may be based on estimating one or more KPIs on the basis of the acquired RSS values that are measured by the terminal devices with various RSS threshold levels, comparing the estimated one or more KPI:s with the target KPI(s), and selecting the lowest RSS threshold level with which the estimated KPI(s) meet the target KPI(s).

Figure 5:
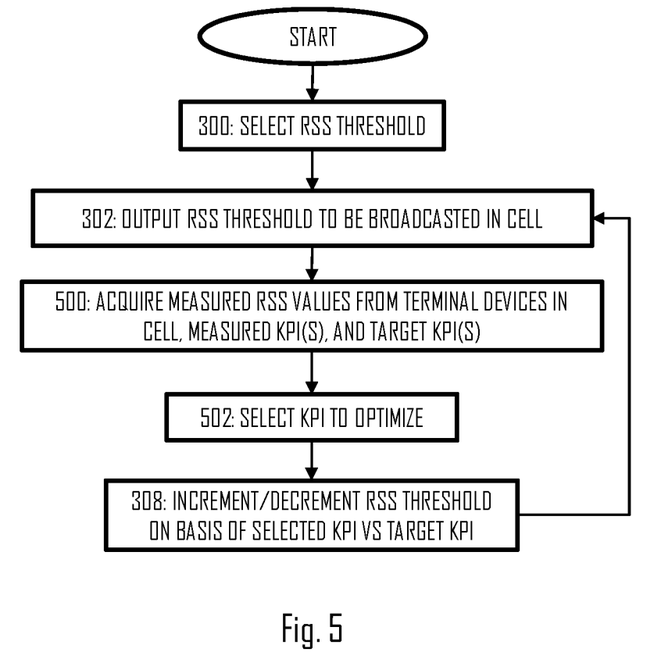
FIG. 5 illustrates an embodiment for updating the RSS threshold on the basis of RSS measurements and measured performance metrics.

FIG. 5 illustrates a method for adjusting the RSS threshold level according to one embodiment. The same reference numbers as in FIG. 3 represent the same or substantially similar functions. During the operation of the access node in the cell, the RSS values are measured by the terminal devices and acquired from the terminal devices in block 500. Furthermore, the target KPI(s) is/are acquired. Furthermore, one or more measured KPIs are acquired in block 500. The measured KPIs may comprise at least partially the same KPI(s) as the target KPI(s). The embodiment of FIG. 5 employs a feedback that adjusts the RSS threshold with an attempt to direct the measured KPI(s) towards the target KPI(s). Each measured KPI may comprise a plurality of KPI values associated with different terminal devices, and the KPI values may be averaged, e.g. within the cell or even over a plurality of cells. In block 502, one of the KPI(s) is selected for optimization. Block 502 may comprise normalizing the measured (averaged) KPI(s) according to Equation (1) or (2):

$$KPI_{measured}^{normalized} = \max_i \log \frac{KPI_{measured,i}}{KPI_{target,i}} \quad (1)$$

$$KPI_{measured}^{normalized} = \max_i (KPI_{measured,i} - KPI_{target,i}) \quad (2)$$

In this selection, the KPI is selected on the basis of a relation between the measured KPI(s) and the KPI targets. The KPI having the highest difference with respect to the corresponding target KPI is selected for optimization. For example, if the rate of failed connection establishments provides the greatest deviation from a target rate for the failed connection establishments, the RSS threshold is adapted to improve the rate of failed connection establishments by raising the RSS threshold. Now, the $KPI_{measured}^{normalized}$ serves as a gradient for the RSS threshold update as follows:

$$RSS\_TH_{update} \sim \lambda KPI_{measured}^{normalized} \quad (3)$$

where $\lambda$ is an arbitrary step size parameter having a positive value. The dependence between the RSS threshold update and $KPI_{measured}^{normalized}$ values may be stored beforehand in a memory.

The feedback mechanism ensures that when the measured KPIs such as call drop rate are above the KPI target, the normalized KPI and consequently the RSS threshold update would be positive. A positive RSS threshold update leads to less terminal devices associated to the main frequency band, thus leading to reduction in the call drop rate and the measured KPI closing the target KPI, assuming other things equal. On the other hand, when the measured KPI is below the target KPI, the corresponding negative RSS threshold update leads to higher measured KPI in the future.

The RSS threshold update value may also be limited, e.g. as follows:

$$RSS\_TH_{update\_clipped} = \min(\max(RSS\_TH_{update}, RSS\_TH_{lower\ bound}), RSS\_TH_{upper\ bound}) \quad (4)$$

This limitation may prevent overly large adjustments to the RSS threshold. The new RSS threshold, limited by the upper bound and the lower bound, may then be defined as:

$$RSS\_TH_{new} = \min(\max(RSS\_TH_{old} + RSS\_TH_{update\_clipped}, RSS\_TH_{lower\ bound}), RSS\_TH_{upper\ bound}) \quad (5)$$

Block 308 may execute Equations (4) and (5) and, as a consequence, the updated RSS threshold may be output for the access node to broadcast in the cell.

In any one of the embodiments described herein, the RSS values used in blocks 306 and 308 may be presented in a form of a discrete probability mass function. The probability mass function may be generated from the measured RSS values by using state-of-the-art methods.

Figure 6:
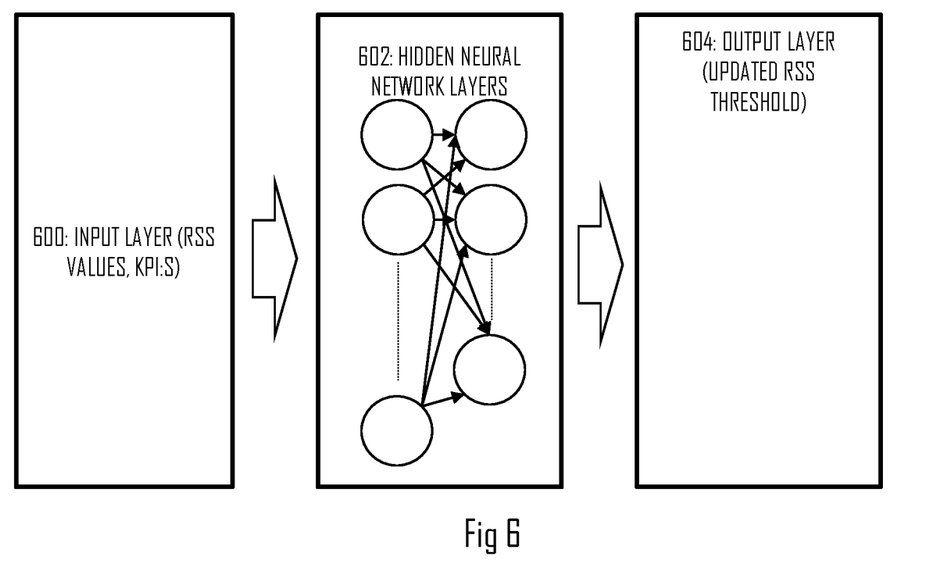
FIG. 6 illustrates a structure of a neural network used in updating the RSS threshold according to an embodiment of the invention.

In an embodiment, a neural network is employed in blocks 306 and 308 to determine the change to the RSS threshold level. The neural network may be trained by using the acquired RSS values and the at least one measured (normalized) KPI $KPI_{measured}^{normalized}$ as a training input and the prior RSS threshold level $RSS\_TH_{old}$ as a training output. When the neural network is operational, the input to the neural network may comprise at least the measured RSS values and the KPI target(s). The KPI target may be set to 0, indicating a perfectly operating system, e.g. no call drops or no failed connection establishments. FIG. 6 illustrates a structure of the neural network according to an embodiment.

Referring to FIG. 6, an input layer 600 of the neural network may comprise the measured RSS values and the KPI values. The KPI values input to the neural network depends on whether the neural network is being trained or is operational. The neural network also comprises one or multiple hidden layers that comprise a network of nodes that process the inputs received from the input layer into an output to an output layer 604. In an embodiment, the neural network is a deep neural network and comprises multiple hidden layers between the input layer and output layer. Interconnections between the nodes and weightings performed in the neural network define how the neural network responds to a particular input, and the weightings are adjusted during a training phase. The output layer 604 of the neural network may then output a RSS threshold level.

Figure 7:
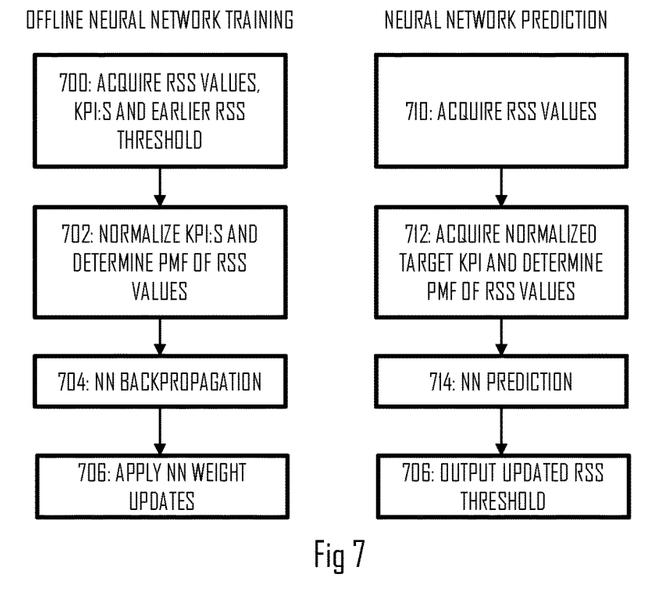
FIG. 7 illustrates an embodiment for offline training of the neural network.

FIG. 7 illustrates a flow diagram for configuring the neural network and a flow diagram defining operation of the neural network when adjusting the RSS threshold. Referring to FIG. 7, the offline training of the neural network may comprise blocks 700 to 706. In block 700, the measured RSS values, measured KPI values, and a reference RSS threshold value are acquired. If the neural network is switched from online to offline for the training, the reference RSS threshold and the measured values may be the most recent values. If the neural network is trained for the first time, a simulated set of RSS values, KPI values, and reference RSS threshold may be used.

In block 702, the measured KPI(s) may be averaged and normalized in the above-described manner, and the probability mass function (PMF) of the RSS values may be determined. Then, the normalized KPI and the PMF may be input to the neural network as a training input, and the reference RSS threshold may be used as a reference output or a training output. It means that the neural network adapts in block 704 its weightings in an attempt to realize the reference output from the training input. Upon successfully training the neural network such that the neural network is capable of generating the training output from the training input, the weights of the neural network are applied to the online operation of the neural network.

In an online operation of the neural network, the measured RSS values are first acquired in block 710, and the PMF of the RSS values is computed in block 712. Furthermore, the normalized target KPI is acquired, e.g. set to zero. The target KPI and the PMF may then be input to the input layer of the neural network, and the neural network may carry out prediction of a new RSS threshold in block 714. The new RSS threshold acquired from the output layer of the neural network may then be output to be broadcasted in the cell.

Figure 8:
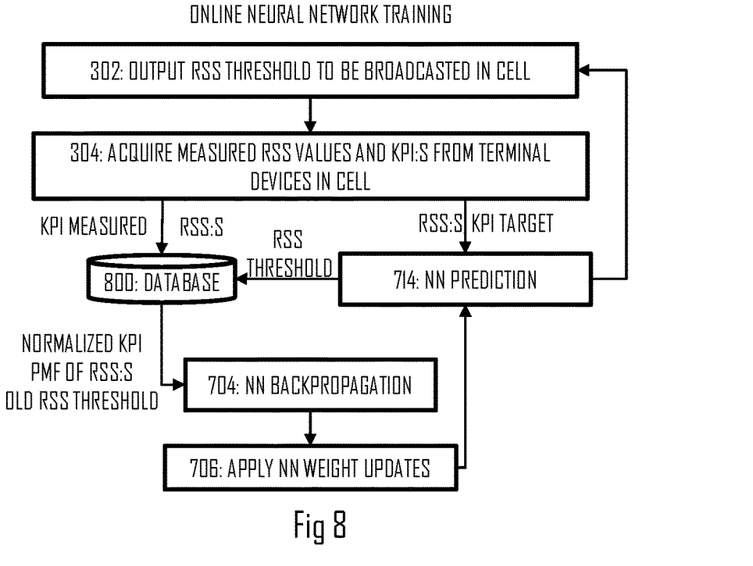
FIG. 8 illustrates an embodiment for online training of the neural network.

In an embodiment, online training is applied to the neural network while the neural network is operational. FIG. 8 illustrates a flow diagram for the online training. The neural network prediction in block 714 may operate in the manner described above in FIG. 7 and, as a consequence, receive the PMF of RSS values and the target KPI (zero) as the input and output the new RSS threshold. Meanwhile, the KPIs and the RSS values resulting from the RSS threshold selection may be measured and stored for the online training. In an embodiment, the measurements and an associated RSS threshold used during the operation of the neural network may be used for the online training of the neural network. A training input to the online training may comprise the PMF of the RSS values measured while a first old RSS threshold was applied in the cell. Another training input may comprise the measured KPI(s) measured while the first old RSS threshold was applied in the cell, e.g. in the following normalized form:

$$KPI_{measured}^{normalized} = \max_{i} \log \frac{KPI_{measured,i}(RSS \text{ threshold\_old})}{KPI_{target,i}} \quad (6)$$

$$KPI_{measured}^{normalized} = \max_{i} (KPI_{measured,i}(RSS \text{ threshold\_old}) - KPI_{target,i}) \quad (7)$$

Further optional inputs may comprise one or more of the above-described time stamps, the locations of the terminal devices, and channel quality information (other than the RSS) measured in association with the terminal devices. The channel quality information may comprise packet loss rate, bit error rate, measured path loss, etc. These training input values may be stored in a database 800. A second old RSS threshold may be used as a training (reference) output in the online training. The second old RSS threshold may be the RSS threshold selected by the neural network as a result of the PMF of the RSS now stored in the database and a KPI target. The second old RSS threshold may also be stored in the database as linked to the first old RSS threshold and the measured PMF of RSS values and/or the measured KPI(s). The database 800 may thus be updated whenever the NN prediction in block 714 selects a new RSS threshold and whenever new RSS and KPI measurements are performed.

The training inputs and the reference output may then be applied in block 704 where the neural network backpropagation is performed and the weight adjustments are determined. Block 704 thus finds weight updates to the neural network that output the second old RSS threshold in response to the PMF of the RSS values and the normalized measured KPI. The new weights are output to the neural network in block 706. The new information that causes the change to the NN weights is the measured KPIs. The performance of the neural network may be monitored on the basis of the measured KPI(s), and the online training may be triggered upon detecting a need for the online training in the monitoring.

In an embodiment, the neural network is a feed-forward neural network.

In another embodiment, the neural network is a recurrent neural network. The recurrent neural network (RNN) is regarded as a powerful neural network architecture for predicting time-evolving data. In this embodiment, the RNN architecture may be used to predict optimized RSS threshold using learned prior RSS threshold settings, prior KPI(s), and measured RSS values. The RNN can take advantage of stored knowledge of similar past trends in its inputs and outputs to learn from the history and to predict the optimal update to the RSS threshold. The RNN can generate an anticipatory RSS threshold that anticipates future behavior of the terminal devices, e.g. their mobility or future RSS PMF on the basis of the history data available to the RNN. The RNN thus employs a memory of the time-evolution of measured RSS distributions. Particularly, a class of RNNs called long short-term memory (LSTM) networks are efficient at capturing such long-term tendencies such as daily semi-cyclic variation of RSS distributions. Particularly the RNN structure benefits when input to the neural network comprise the above-described time stamps and/or locations of the terminal devices.

Figure 9:
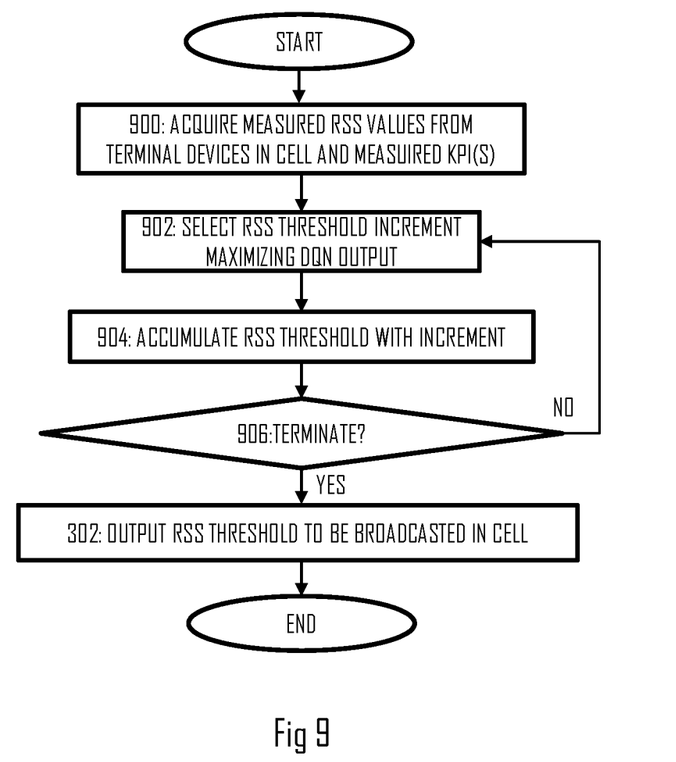
FIG. 9 illustrates a step-wise RSS threshold update procedure.

In an embodiment, the change to the RSS threshold level is carried out in a series of steps within one execution of blocks 306 and 308. FIG. 9 illustrates such an embodiment. Referring to FIG. 9, the process comprises the acquisition of the measured RSS values and the measured KPI(s), as described above (block 900). In block 902, an increment value to the RSS threshold level is selected and an effect of the increment value on the at least one KPI is determined. Block 902 may comprise evaluating multiple increments and their respective effects on the KPI(s) and selecting an increment that provides the best effect on the at least one KPI amongst the candidates. If none of the candidates is determined to improve the KPI(s), a null increment may be selected. Upon selecting the increment, the RSS threshold is accumulated with the increment in block 904. In block 906, it is determined whether or not to terminate the series of steps. For example, if the increment was null, the process may terminate and the accumulated RSS threshold value output in block 302. Otherwise, the process may return to block 902 for another iteration and selection of a new increment to the RSS threshold.

In the embodiment of FIG. 9, the change to RSS threshold may be described as:

$$RSS\_TH_{update} = \Sum_{n=1}^{N} RSS\_TH_{MiniUpdate,n} \quad (8)$$

Block 902 may employ a reinforced learning method wherein a deep-Q-network (DQN) is used to arrive at the optimized SUL RSRP threshold. The method may be useful when the allowed range of RSS threshold update values is limited, e.g. not allowed to change dramatically. The limited range in the possible update values may also help the reinforced learning method to avoid overshooting the optimized update RSS threshold value and, consequently, avoid overshooting the target KPI. A DQN model characterizing the effect (a Q value) determined in block 902 may be defined as:

$$Q(s, a) = r(s, a) + \gamma \max_{a'} Q(s'(s, a), a') \quad (9)$$

where $0 < \gamma \leq 1$. s is a current state of the system represented by the measured RSS values, the measured normalized KPI(s), the prior RSS threshold and, optionally, the other input values described above. The prior RSS threshold may refer to the RSS threshold before executing the first iteration of FIG. 9 and/or to the incremented RSS threshold, depending on the implementation. a is an action taken, e.g. the increment, and it is equal to the sum of an immediate reward (or effect) r(s,a) and a potential maximum future reward (or effect) max Q(s'(s,a),a') of a new state s' to which the system will transition upon a'taking the action a.

The reward r(s,a) may also be defined in terms of an increase in a fit function indicating the difference between the predicted KPI resulting from the increment and the target KPI, and it may be defined as:

$$r(s,a) = F(s'(s,a)) - F(s) \quad (10)$$

The fit function may be defined as:

$$F(s) = \min_i \log \frac{KPI_{target,i}}{|KPI_{predicted,i}(RSS_{Accumulated}) - KPI_{target,i}|} \quad (11)$$

$$F(s'(s, a)) = \min_i \log \frac{KPI_{target,i}}{|KPI_{predicted,i}(RSS_{Accumulated} + RSS\_TH_{MiniUpdate}(a)) - KPI_{target,i}|} \quad (12)$$

$RSS_{accumulated}$ refers to the earlier RSS threshold as updated by previous iterations in the process of FIG. 9.

Figure 10:
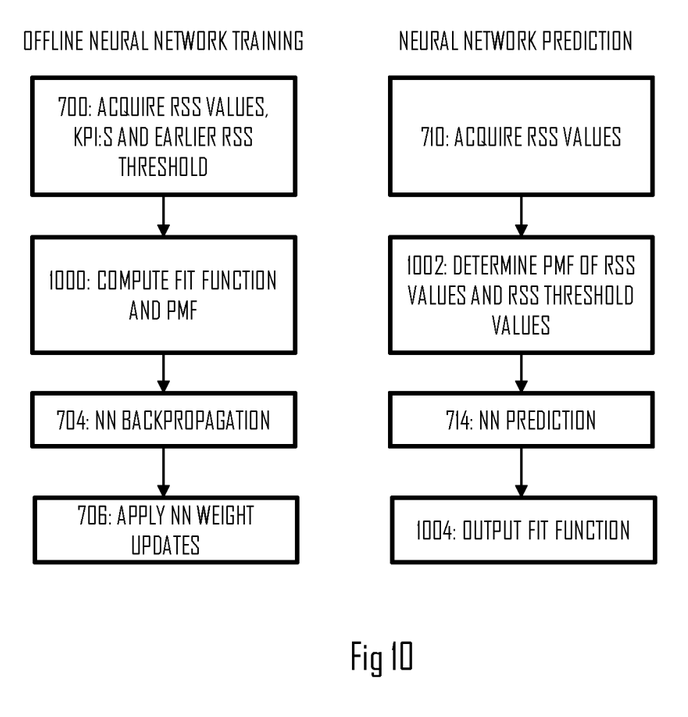
FIG. 10 illustrates an embodiment for training a neural network used in the process of FIG. 9.

Now, the evaluation of the effect requires estimation of the predicted effect on the KPI(s), i.e. $KPI_{predicted,i}$. This embodiment may employ a deep neural network to predict the fit function on the basis of a given input comprising at least the measured RSS values (in the form of a PMF, for example) and the relevant RSS threshold values, e.g. $RSS_{Accumulated}$ and $RSS_{Accumulated} + RSS\_TH_{MiniUpdate}(a)$ so that Equations (11) and (12) can be solved. Further inputs may include the time stamps, locations of the terminal devices, and channel quality indicators, as described above. FIG. 10 illustrates the training of the neural network to estimate the fit function from the input RSS values and the RSS threshold values. Referring to FIG. 10, the training of the neural network may comprise the block 700 where the measured RSS values, measured KPI(s), and a reference RSS threshold is acquired. The reference RSS threshold may be the one valid while measuring the RSS values and the KPI(s). In block 1000, the fit functions F(s) and F(s'(s,a) are computed according to Equations (11) and (12) in block 1000 such that the measured KPI is provided in the denominator. The fit function may then be used as a reference output in the training of the neural network, while the PMF of the RSS values and $RSS_{Accumulated}$ and $RSS_{Accumulated} + RSS\_TH_{MiniUpdate}(a)$ are input values for the execution of block 704. One training input/output pair may be $RSS_{Accumulated}$ and the fit function F(s) while another training input/output pair may be $RSS_{Accumulated} + RSS\_TH_{MiniUpdate}(a)$ and the fit function F(s'(s,a).

In the operation, the neural network may receive as input values the $RSS_{Accumulated}$ and $RSS_{Accumulated} + RSS\_TH_{MiniUpdate}(a)$ as well as the PMF of the measured RSS values, as determined in block 1002. The output of the neural network is the fit functions F(s) and F(s'(s,a) (block 1004).

Figure 11:
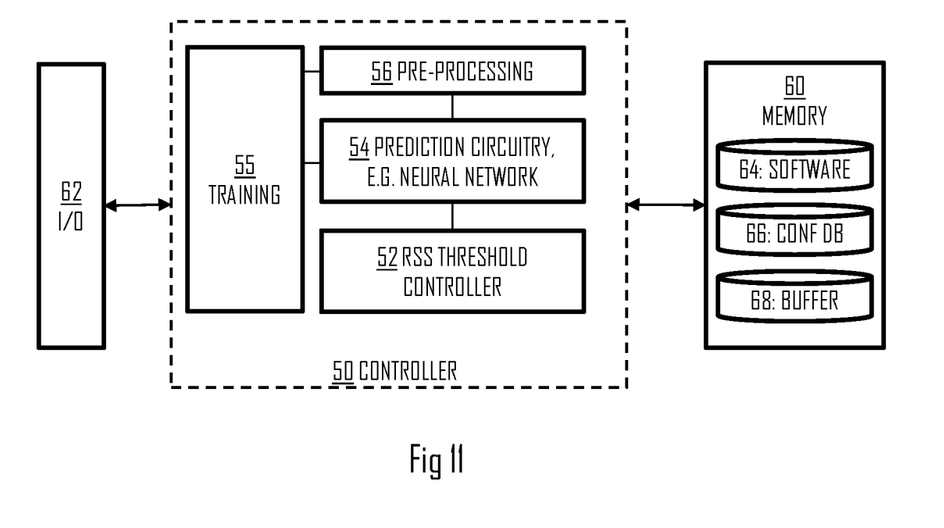
FIG. 11 illustrates an apparatus according to an embodiment of the invention.

FIG. 11 illustrates an apparatus comprising a controller 50, such as at least one processor or processing circuitry, and at least one memory 60 including a computer program code (software) 64, wherein the at least one memory and the computer program code (software) are configured, with the at least one processor, to cause the apparatus to carry out the process of FIG. 3 or any one of its embodiments described above. The apparatus may be for the access node (e.g. the gNB) or a controller controlling the operation of the access node according to the embodiments of the invention, e.g. by selecting the RSS threshold for the access node 104. The apparatus of FIG. 11 may be an electronic device.

Referring to FIG. 11, the memory 60 may be implemented using any suitable data storage technology, such as semiconductor based memory devices, flash memory, magnetic memory devices and systems, optical memory devices and systems, fixed memory and removable memory. The memory may comprise a configuration database 66 for storing configuration parameters, e.g. the target KPI(s) and parameters of the neural network selected as a result of the above-described training. The parameters may be stored beforehand to the configuration database 66, e.g. before the apparatus is first taken to use.

Referring to FIG. 11, the apparatus may further comprise a communication interface 62 comprising hardware and/or software for realizing communication connectivity according to one or more communication protocols. The communication interface 62 may provide the apparatus with radio communication capabilities in a wireless network, e.g. a radio access network of a cellular communication system. The radio communication capability may be provided in embodiments where the apparatus is the access node. In other embodiments, the communication interface may support a wired communication protocol, e.g. when the apparatus is a controller physically separate from the access node. The communication interface may comprise standard well-known analog radio components such as an amplifier, filter, frequency-converter and circuitries, conversion circuitries transforming signals between analog and digital domains, and one or more antennas.

The controller 50 may comprise a pre-processing circuitry 56 configured to pre-process measurement data, e.g. to execute block 304, 500, 700 and 702, 710 and 712, 800, 900, 1000, or 1002. The pre-processing circuitry 56 may thus perform the computation of the PMF, normalization of the measured KPI(s), and/or other necessary preparations for the selection of the RSS threshold update. The pre-processing circuitry 56 may output the pre-processed data to a prediction circuitry 54 configured to execute blocks 306 and 308 or any one of their embodiments, e.g. block 502, 714, or 902 to 906. The prediction circuitry may output an update to the RSS threshold value to an RSS threshold controller 52 configured to manage the RSS threshold. The RSS threshold controller may control the access node to apply the updated RSS threshold.

The controller 50 may further comprise a training circuitry configured to train the prediction circuitry, e.g. when the prediction circuitry comprises a neural network. The training circuitry may be configured to carry out the offline training or online training described above and reconfigure weights and/or other parameters of the prediction circuitry 54.

At least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the access nodes. For example, an access node utilizing such shared architecture, may comprise a remote control unit (RCU) or central unit (CU), such as a host computer or a server computer, operatively coupled (e.g. via a wireless or wired network) to a remote radio head (RRH) or distributed unit (DU), such as a Transmission Reception Point (TRP), located in the access node. An RCU may generate a virtual network through which the RCU communicates with an RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into a server computer or a host computer (i.e. to the RCU). External network virtualization is targeted to optimized network sharing. Another category is internal virtual networking which provides network-like functionality to the software containers on a single system. A virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

At least some of the processes described above may be performed by the RCU or shared among the RRH and the RCU.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 3 to 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 10 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 3 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 3 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
    at least one processor; and
    at least one memory including computer program code, the at least one memory and computer program code configured to, with the at least one processor, cause the apparatus to:
        select a received signal strength threshold level configured to be used for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level;
        output the received signal strength threshold level to be broadcasted in a cell to at least one terminal device, wherein the broadcasted received signal strength threshold level is configured to be used for the determining of whether the uplink resource of the terminal device is allocated from the first frequency band or from the second frequency band;
        acquire received signal strength values measured for a plurality of terminal devices in the cell while the received signal strength threshold level has been applied to the cell, and determine at least one performance metric target; and
        change the received signal strength threshold level on the basis of the measured received signal strength values and the at least one performance metric target.

2. The apparatus of claim 1, wherein the at least one memory and the computer program code are further configured, with the at least one processor, to cause the apparatus to acquire at least one performance metric measured while the received signal strength threshold level has been applied to the cell and to change the received signal strength threshold level further on the basis of the measured at least one performance metric.

3. The apparatus of claim 2, wherein the at least one measured performance metric comprises at least one of a disconnection rate, a connection setup failure rate, or a channel quality indicator.

4. The apparatus of claim 1, wherein the at least one memory and the computer program code are further configured, with the at least one processor, to cause the apparatus to acquire locations of the plurality terminal devices and to change the received signal strength threshold level further on the basis of the locations of the plurality of terminal devices.

5. The apparatus of claim 1, wherein the at least one memory and the computer program code are further configured, with the at least one processor, to cause the apparatus to acquire time stamps indicating a time of measuring the received signal strength values and to change the received signal strength threshold level further on the basis of the time stamps.

6. The apparatus of claim 1, wherein the at least one memory and the computer program code are further configured, with the at least one processor, to cause the apparatus to set an upper bound and a lower bound for the received signal strength threshold level and to change the received signal strength threshold level within the upper bound and the lower bound.

7. The apparatus of claim 1, wherein the at least one memory and the computer program code are further configured, with the at least one processor, to cause the apparatus to change the received signal strength threshold level on the basis of a relation between the at least one measured performance metric and the at least one performance metric target.

8. The apparatus of claim 1, wherein the at least one memory and the computer program code are further configured, with the at least one processor, to cause the apparatus to employ a neural network to determine the change to the received signal strength threshold level, wherein the neural network is configured to be trained with using the acquired received signal strength values and at least one measured performance metric as a training input and the selected received signal strength threshold level as a training output.

9. The apparatus of claim 8, wherein the neural network is a recurrent neural network.

10. The apparatus of claim 1, wherein the at least one memory and the computer program code are further configured, with the at least one processor, to cause the apparatus to change the received signal strength threshold level in a series of steps, each step comprising:
    selecting an increment value to the received signal strength threshold level and estimating an effect of the increment value on the at least one performance metric;
    accumulating the received signal strength threshold level with the increment value; and
    determining whether or not to terminate the series of steps.

11. The apparatus of claim 10, wherein the effect of the increment value on the at least one performance metric is configured to be estimated using a neural network, wherein the at least one memory and the computer program code are further configured, with the at least one processor, to cause the apparatus to train neural network with using at least one of the acquired received signal strength values, at least one measured performance metric, and the increment value or another increment value as a training input and a known effect of the increment value on the at least one performance metric as a training output.

12. The apparatus of claim 1, wherein the at least one memory and the computer program code are further configured, with the at least one processor, to cause the apparatus to:
   determine at least one measured performance metric;
   determine a difference between the at least one measured performance metric and the at least one performance metric target, wherein a relatively lower value for the at least one measured performance metric corresponds to better performance compared to a relatively higher value for the at least one measured performance metric;
   decrease the received signal strength threshold level, in response to the difference being negative, to allocate at least one more uplink resource of the terminal device from the first frequency band or at least one less uplink resource of the terminal device from the second frequency band; and
   increase the received signal strength threshold level, in response to the difference being positive, to allocate at least one less uplink resource of the terminal device from the first frequency band or at least one more uplink resource of the terminal device from the second frequency band.

13. The apparatus of claim 12, wherein the at least one measured performance metric is based on the received signal strength values.

14. The apparatus of claim 1, wherein the at least one memory and the computer program code are further configured, with the at least one processor, to cause the apparatus to:
   determine at least one measured performance metric;
   determine a difference between the at least one measured performance metric and the at least one performance metric target, wherein a relatively higher value for the at least one measured performance metric corresponds to better performance compared to a relatively lower value for the at least one measured performance metric;
   increase the received signal strength threshold level, in response to the difference being negative, to allocate at least one more uplink resource of the terminal device from the second frequency band or at least one less uplink resource of the terminal device from the first frequency band; and
   decrease the received signal strength threshold level, in response to the difference being positive, to allocate at least one less uplink resource of the terminal device from the second frequency band or at least one more uplink resource of the terminal device from the first frequency band.

15. The apparatus of claim 14, wherein the at least one measured performance metric is based on the received signal strength values.

16. The apparatus of claim 1, wherein the at least one memory and the computer program code are further configured, with the at least one processor, to cause the apparatus to:
   determine multiple differences between measured performance metrics and performance metric targets;
   wherein the at least one performance metric target is determined to be the performance metric target associated with the largest difference in absolute value among the multiple differences between the measured performance metrics and the performance metric targets.

17. A method comprising:
   selecting, with a network node, a received signal strength threshold level configured to be used for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level;
   outputting, with the network node, the received signal strength threshold level to be broadcasted in a cell to at least one terminal device, wherein the broadcasted received signal strength threshold level is configured to be used for the determining of whether the uplink resource of the terminal device is allocated from the first frequency band or from the second frequency band;
   acquiring, with the network node, received signal strength values measured for a plurality of terminal devices in the cell while the received signal strength threshold level has been applied to the cell, and determining at least one performance metric target; and
   changing, with the network node, the received signal strength threshold level on the basis of the measured received signal strength values and the at least one performance metric target.

18. The method of claim 17, further comprising with the network node:
   acquiring at least one performance metric measured while the received signal strength threshold level has been applied to the cell; and
   changing the received signal strength threshold level further on the basis of the measured at least one performance metric.

19. The method of claim 18, wherein the at least one measured performance metric comprises at least one of a disconnection rate, a connection setup failure rate, or a channel quality indicator.

20. The method of claim 17, further comprising with the network node:
   acquiring locations of the plurality terminal devices; and
   changing the received signal strength threshold level further on the basis of the locations of the plurality of terminal devices.

21. The method of claim 17, further comprising with the network node:
   acquiring time stamps indicating a time of measuring the received signal strength values; and
   changing the received signal strength threshold level further on the basis of the time stamps.

22. The method of claim 17, further comprising with the network node:
   setting an upper bound and a lower bound for the received signal strength threshold level; and changing the received signal strength threshold level within the upper bound and the lower bound.

23. The method of claim 17, the method further comprises with the network node:
changing the received signal strength threshold level on the basis of a relation between the at least one measured performance metric and the at least one performance metric target.

24. The method of claim 17, further comprising with the network node:
employing a neural network to determine the change to the received signal strength threshold level, and
training the neural network with using the acquired received signal strength values and at least one measured performance metric as a training input and the selected received signal strength threshold level as a training output.

25. The method of claim 24, wherein the neural network is a recurrent neural network.

26. The method of claim 17, further comprising with the network node: changing the received signal strength threshold level in a series of steps, each step comprising:
selecting an increment value to the received signal strength threshold level and estimating an effect of the increment value on the at least one performance metric;
accumulating the received signal strength threshold level with the increment value; and
determining whether or not to terminate the series of steps.

27. The method of claim 26, wherein the effect of the increment value on the at least one performance metric is estimated with using a neural network; level, and wherein the method further comprises with the network node:
training the neural network with using at least one of the acquired received signal strength values, at least one measured performance metric, and the increment value or another increment value as a training input and a known effect of the increment value on the at least one performance metric as a training output.

28. A computer program product embodied on a non-transitory computer-readable medium and comprising a computer program code readable by a computer, wherein the computer program code configures the computer to carry out a computer process comprising:
selecting a received signal strength threshold level configured to be used for determining whether an uplink resource of a terminal device is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level;
outputting the received signal strength threshold level to be broadcasted in a cell to at least one terminal device, wherein the broadcasted received signal strength threshold level is configured to be used for the determining of whether the uplink resource of the terminal device is allocated from the first frequency band or from the second frequency band;
acquiring received signal strength values measured for a plurality of terminal devices in the cell while the received signal strength threshold level has been applied to the cell, and determining at least one performance metric target; and
changing the received signal strength threshold level on the basis of the measured received signal strength values and the at least one performance metric target.

29. An apparatus comprising:
at least one processor; and
at least one memory including computer program code, the at least one memory and computer program code configured to, with the at least one processor, cause the apparatus to:
determine a received signal strength threshold level configured to be used for determining whether an uplink resource of the apparatus is allocated from a first frequency band or from a second frequency band, wherein the first frequency band is on higher frequencies than the second frequency band, and wherein the first frequency band is for terminal devices having a received signal strength above the received signal strength threshold level and the second frequency band is for terminal devices having the received signal strength below the received signal strength threshold level;
determine the received signal strength threshold level based on a broadcast in a cell to at least one terminal device, wherein the broadcasted received signal strength threshold level is configured to be used for the determining of whether the uplink resource of the apparatus is allocated from the first frequency band or from the second frequency band;
measure at least one received signal strength value in the cell while the received signal strength threshold level has been applied to the cell;
transmit, to a network entity, the measured at least one received signal strength value; and
determine a change to the received signal strength threshold level, wherein the change to the received signal strength threshold level is based on the measured at least one received signal strength value and at least one performance metric target.

30. The apparatus of claim 29, wherein the at least one memory and the computer program code are further configured, with the at least one processor, to cause the apparatus to:
select the first frequency band for use of the uplink resource, in response to the measured at least one received signal strength value being larger than the received signal strength threshold level; and
select the second frequency band for use of the uplink resource, in response to the measured at least one received signal strength value being smaller than the received signal strength threshold level.

* * * * *